United States Patent [19]

Zerrer

[11] Patent Number: 4,529,099
[45] Date of Patent: Jul. 16, 1985

[54] CLOSURE FOR A FUEL TANK

[75] Inventor: Gerhard Zerrer, Korb, Fed. Rep. of Germany

[73] Assignee: Andreas Stihl, Waiblingen, Fed. Rep. of Germany

[21] Appl. No.: 657,237

[22] Filed: Oct. 3, 1984

[30] Foreign Application Priority Data

Oct. 5, 1983 [DE] Fed. Rep. of Germany ....... 3336149

[51] Int. Cl.$^3$ ............................................. B65D 45/00
[52] U.S. Cl. .................................. 220/315; 220/288; 220/318; 215/218; 215/221
[58] Field of Search ............... 220/288, 295, 304, 315, 220/318; 215/219, 217, 218, 220, 221

[56] References Cited

U.S. PATENT DOCUMENTS 3,537,283 11/1970 Mross .................................. 220/315
4,491,251 1/1985 Pratz et al. .......................... 220/318

Primary Examiner—George T. Hall
Attorney, Agent, or Firm—Walter Ottesen

[57] ABSTRACT

The invention is directed to a threaded closure for a fuel tank and includes a thread formed on a fuel inlet stub of the tank. A closure cap has a thread for engaging the thread on the inlet stub. A latch member is arranged on the closure cap and includes a peripheral ring which is mounted on the base body of the closure cap so as to be axially journalled thereon for movement between an unlatched position whereat a handle of the peripheral ring projects beyond the upper surface of the base body to facilitate manually grasping the closure cap and for providing a visual indication that the latch member is in the unlatched position. The peripheral ring includes a toothing formed on the inner wall surface thereof for engaging the toothing formed on the outer wall surface of the inlet stub when the latch member is in the latched position thereby preventing an unintended rotation of the closure cap. Also, in the latched position, the handle is recessed in a recess formed in the base body of the cap.

15 Claims, 5 Drawing Figures

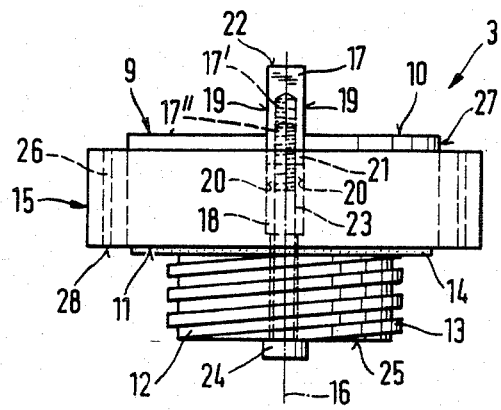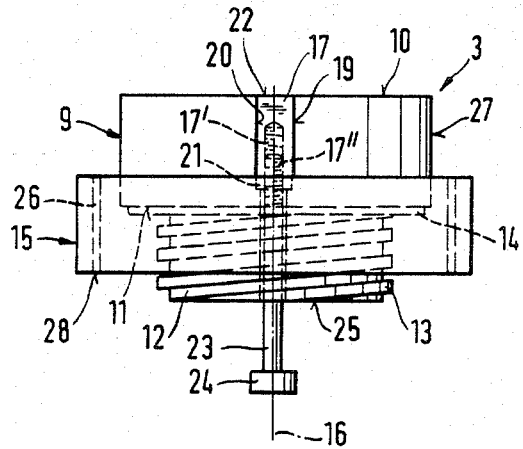

CLOSURE FOR A FUEL TANK

FIELD OF THE INVENTION

The invention relates to a threaded closure for a fuel tank such as the kind utilized with hand-guided, motor-driven tools such as motor-driven chain saws and the like. The closure includes a thread formed on an inlet stub of the tank and a closure cap equipped with means for securing the cap against an unintentional rotation thereof.

BACKGROUND OF THE INVENTION

A known threaded closure of the kind described above includes an outer thread formed on the inlet stub of the fuel tank on which a closure cap having an inner thread can be threadably attached. A latch to prevent an inadvertent opening of the closure is provided in the region beneath the thread of the inlet stub. The latch includes latching parts which are displaceable in a direction transverse to the axis of the threaded closure such that the closure cap is secured against removal after the latching mechanism is actuated.

In arrangements of this kind, the latched position of the closure is not clearly visible to the operator because no arrangement is provided which shows the position of the latch. Further, the latching mechanism of known configurations is relatively complicated and expensive to manufacture.

SUMMARY OF THE INVENTION

It is an object of the invention to provide a threaded closure wherein there is a positive separation between the step of rotating the cap closed and the step of securing the latch with a clear indication of the position of the latter while at the same time making it easier for the operator to close the cap when in the unlatched condition.

The threaded closure of the invention is for a fuel tank with a fuel inlet stub defining a longitudinal axis. The tank is adaptable for a hand-held, motor-driven tool such as a motor-driven chain saw or the like. The threaded closure of the invention includes: a first thread formed on the fuel inlet stub; a closure cap including a base body defining a longitudinal axis coincident with the first-mentioned longitudinal axis and having a top surface facing away from the inlet stub; and, a second thread formed on the base body for threadably engaging the first thread when the cap is placed on the inlet stub and manually rotated about the axis to close the tank; a manually-actuable latch member displaceably journalled on the cap for movement relative to the cap and in a plane along the axis between an unlatched position whereat the latch member is spaced away from the inlet stub so as to project upwardly beyond the top surface to provide a visual indication that the cap is unlatched and a latched position whereat the latch member is depressed in elevation with respect to the cap so as to be in engagement with the inlet stub; and, catch means formed on the inlet stub and on the latch member for engaging the latch member when in the latched position to block any rotational movement about the axis of the closure cap whereby the cap is secured in the closed position thereof against an inadvertent rotational movement especially during operational use of the tool.

BRIEF DESCRIPTION OF THE DRAWING

The invention will now be described with reference to the drawing wherein:

FIG. 4 is a side elevation view of the cap in the unlatched position and viewed from a position 90° from the position shown in FIG. 2; and, FIG. 5 is a side elevation view of the cap of FIG. 4 showing the cap in the latched position.

DESCRIPTION OF THE PREFERRED EMBODIMENTS OF THE INVENTION

Figure 1:
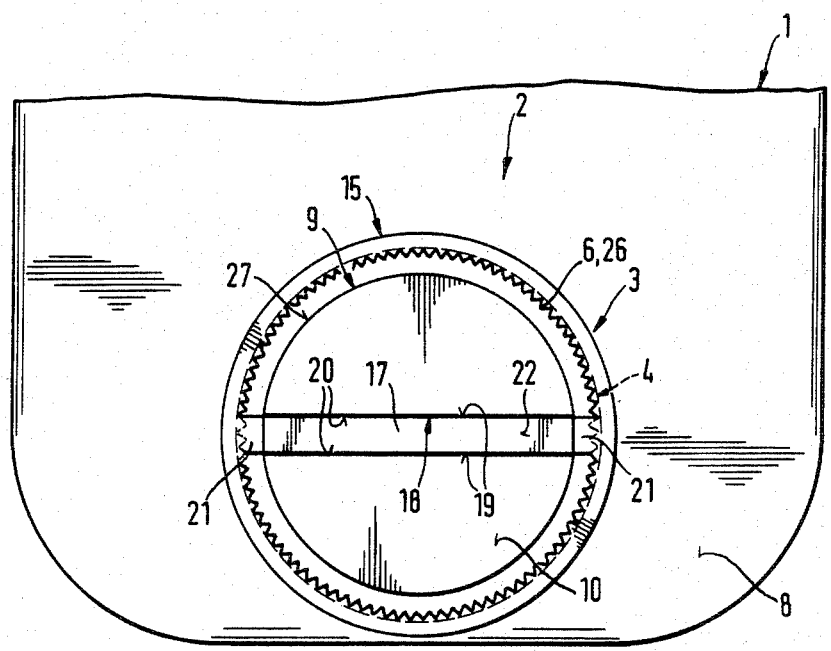
FIG. 1 is a plan view of a portion of a fuel tank equipped with the threaded closure according to the invention.

The fuel tank 1 shown in FIG. 1 is especially suitable for portable power-driven chain saws and motor-driven cut-off machines or the like. The fuel tank is made of plastic and is provided with a threaded closure 2 which includes a closure cap 3 disengageably attached to a fuel filling inlet stub 4 of the fuel tank 1.

Figure 2:
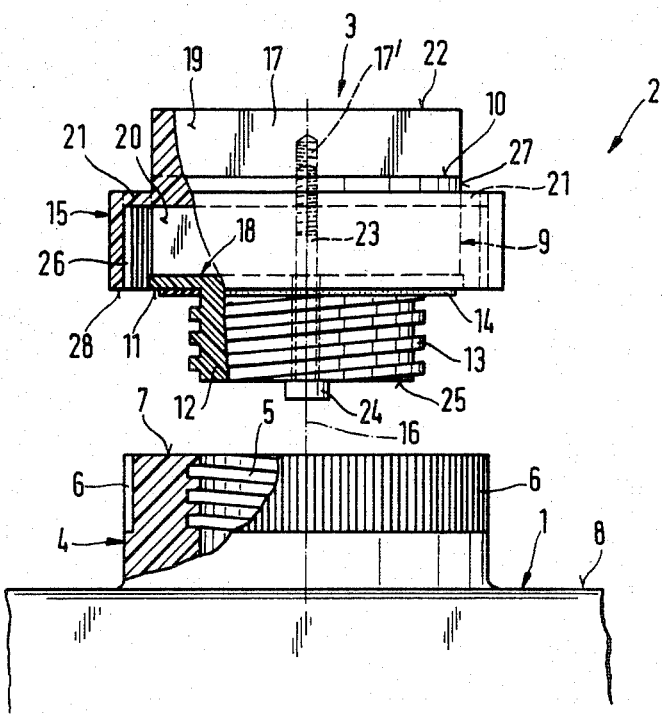
FIG. 2 is a front elevation view, partially in section, showing the threaded closure of the fuel tank of FIG. 1 wherein the cap has been threadably disengaged from the tank.

The inlet stub 4 is made of the same material as the fuel tank and the fuel tank and inlet stub are made as one piece. The inlet stub 4 has an internal thread 5 formed on the inner wall thereof; whereas, an outer toothing 6 is formed about the outer peripheral surface of the stub 4. The outer toothing 6 is advantageously formed as a plurality of fine teeth in that the teeth and teeth gaps have only very small spacings therebetween. The toothing 6 is configured to begin directly at the sealing surface 7 so that it is approximately in the same plane as the inner thread 5 which likewise starts out directly from the sealing surface 7. The inner thread 5 and the outer toothing 6 are therefore not arranged one behind the other in the direction of longitudinal axis 16; rather, they are at the same region of elevation of the inlet stub 4 as shown in FIG. 2 so that the stub 4 is short and a savings of space is realized so that the inlet stub 4 just projects only very little above the upper surface 8 of the fuel tank 1.

The closure cap 3 includes a cylindrical base body 9 which has a threaded plug 12 projecting downwardly from its lower surface 11 lying opposite to its outer surface 10. The threaded plug 12 and the base body 9 are made as one piece of the same material which is preferably a robust plastic.

The threaded plug 12 has an outer thread 13 for threadably engaging the inner thread 5 of the inlet stub 4. In addition, an annular sealing disc 14 is located at the threaded plug 12 such that it lies on the lower surface 11 of the base body 9 and is pressed against the upper sealing surface 7 of the inlet stub 4 when the closure cap 3 threadably engages the latter so that a tight seal is provided and no fuel can flow from the tank even when the tank is subjected to an intense reciprocatory motion and even when it is inclined, for example, as it would be as part of a motor-driven chain saw, a cut-off machine or the like.

The closure cap 3 also includes a peripheral ring 15 which likewise is made of robust plastic. The ring 15 is journalled on the base body 9 so as to be displaceable in the longitudinal direction of the axis 16. The circularly-shaped peripheral ring 15 includes a transverse strut along its diameter which is advantageously configured as an indicator handle 17. The handle 17 is made of the same material as the peripheral ring 15. The indicating handle 17 is so arranged on the peripheral ring 15 that it extends so far above the end face of the peripheral ring 15 and the upper outer surface 10 of the base body 9 when in the unlatched position as shown in FIGS. 2 and 4 that, on the one hand, the handle 17 defines a positive optical position indicator and, on the other hand, permits an uninterrupted free grasp for the hand of the operator so that the closure cap 3 can be easily rotated and closed tightly against the sealing surface 7.

The indicating handle 17 has a rectangular cross-section whereby the thickness or width of the indicating handle 17 corresponds approximately to the thickness of the wall of the peripheral ring 15. The base body 9 includes a recess 18 which extends up to the upper outer surface 10 and extends diametrically across the base body 9 in the form of a transverse slot. The indicating handle 17 is journalled in the recess 18 so as to be displaceable in elevation. The cross-section of the recess 18 is likewise of rectangular cross-section and is so dimensioned that the indicating handle 17 is guided therein substantially without play whereby the side surfaces 19 of the indicating handle 17 lie in gliding contact on the mutually parallel side walls 20 of the recess 18.

The depth of the recess 18 in the base body 9 is so dimensioned that it advantageously has the same height as the indicating handle 17 including its foot portion 21 measured from the lower edge of the latter to the upper edge 22. The foot portion 21 of the indicating handle 17 is in contact engagement with the base body 9 also when it is in the unlatched position so that rotational forces may be transferred to the base body. Accordingly, the foot portion always remains in the recess 18.

The peripheral ring 15 and the indicating handle 17 are journalled on the base body 9 via an axial bolt 23 so as to be axially displaceable with respect to the base body 9. The axial bolt 23 extends through an axial bore of the base body 9 and has a limiting head 24 at its lower end which projects beyond the end face 25 of the threaded plug 12. The axial bolt 23 can be configured as a simple threaded bolt which has a forward threaded portion threadably engaging a thread 17' formed in a blind bore of the indicating handle 17.

The peripheral ring 15 further includes an inner toothing 26 which corresponds to the outer toothing 6 of the inlet stub 4 and is configured as fine toothing on the entire inner peripheral surface. The inner toothing 26 is brought into engagement with the outer toothing 6 of the inlet stub 4 by means of an axial displacement of the peripheral ring 15 and of the indicating handle 17 out of the unlatched position into the latched position. This displacement occurs after the closure cap 3 is tightly rotated so that a trouble free latching of the closure cap 3 against an inadvertent loosening thereof is provided by means of the meshed engagement of the toothings 6 and 26 with each other.

To open the closure 2, first the peripheral ring with its indicating handle 17 are pulled upwardly out of the latching position so that the inner toothing 26 becomes disengaged from the outer toothing 6 and the handle 17 projects visibly from the recess 18 in such a manner that the indicating handle 17 positively shows the unlatched position. In this way, it is immediately recognizable whether the threaded closure 2 is latched or unlatched.

After unlatching which is an individual and separate actuating step, the closure cap 3 can be threadably disengaged from the inlet stub 4 by appropriately grasping the indicating handle 17 and rotating the same which likewise is a separate and independent actuating step.

FIGS. 2 and 4 show that for the unlatched position of the closure cap 3, the peripheral ring 15 is disposed with its inner toothing 26 in the region of a peripheral surface 27 of the base body 9 so that the inner toothing 26, when viewed in the longitudinal direction of the axis 16, lies above the outer thread 13 of the threaded plug 12. For this position, the lower end face 28 of the peripheral ring 15 is approximately in a common plane with the lower surface 11 of the base body 9. Also for this position, the indicating handle 17 projects so far above the outer surface 10 of the base body 9 that the limiting head 24 of the axial bolt 23 lies against the lower end face 25 of the threaded plug 12 whereby an end stop in the upward direction is provided and the peripheral ring 15 with the indicating handle 17 cannot be lifted up away from the base body 9.

Figure 3:
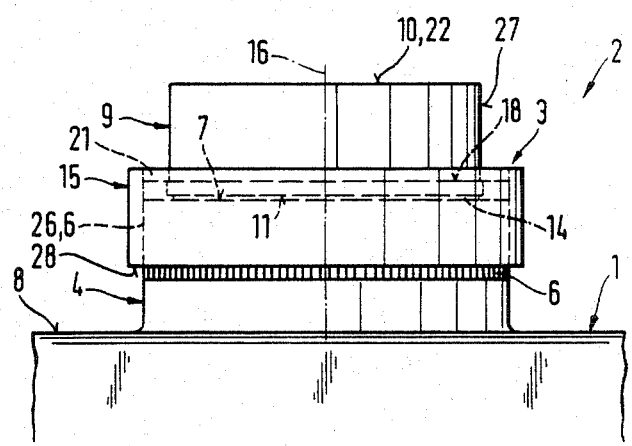
FIG. 3 is a front elevation view of the closure arrangement of FIG. 2 with the cap threadably engaged with the inlet stub.

FIGS. 3 and 5 show the latched position of the closure cap 3. In this position, the peripheral ring 15 has been depressed downwardly so far by axial displacement that the indicating handle 17 lies in the recess 18 of the base body 9 whereby the narrow upper edge of the indicating handle 17 conjointly defines a single plane with the upper outer surface 10 of the base body 9 so that an even upper surface without disturbing projections or recesses is provided.

Furthermore, in the latched position of the closure cap 3, the peripheral ring 15 with the inner toothing 26 is located in the peripheral region of the outer thread 13 of the threaded plug 12 and is therefore in the region of the inner thread 5 of the inlet stub 4 whereby the closure 2 together with its latching toothing is configured as a short and compact arrangement.

FIG. 5 shows the closure cap 3 in the latched position wherein the limiting head 24 of the axial bolt 3 is displaced downwardly as shown because of the axial displacement of the indicating handle 17 into the recess 18 of the base body 9. The limiting head 24 is displaced by an amount equal to the axial displacement and is located at a position spaced from the end face 25 of the threaded plug 12.

It is understood that the foregoing description is that of the preferred embodiments of the invention and that various changes and modifications may be made thereto without departing from the spirit and scope of the invention as defined in the appended claims.

What is claimed is:

1. A threaded closure for a fuel tank with a fuel inlet stub defining a longitudinal axis, the tank being adaptable for a hand-guided, motor-driven tool such as a motor-driven chain saw or the like, the threaded closure comprising:

a first thread formed on the fuel inlet stub;

a closure cap including a base body defining a longitudinal axis coincident with the first-mentioned longitudinal axis and having a top surface facing away from the inlet stub; and, a second thread formed on said base body for threadably engaging said first thread when said cap is placed on said inlet stub and manually rotated about said axis to close the tank;

a manually-actuable latch member displaceably journalled on said cap for movement relative to said cap and in a plane along said axis between an unlatched position whereat said latch member is spaced away from said inlet stub so as to project upwardly beyond said top surface to provide a visual indication that said cap is unlatched and a latched position whereat said latch member is depressed in elevation with respect to said cap so as to be in engagement with said inlet stub; and, catch means formed on said inlet stub and on said latch member for engaging said latch member when in said latched position to block any rotational movement about said axis of said closure cap whereby said cap is secured in the closed position thereof against an inadvertent rotational movement especially during operational use of the tool.

2. The threaded closure of claim 1, said cap including recess means formed therein so as to be coincident with said plane;

said latch member including: a peripheral ring disposed in surrounding concentric relationship to said base body; and, structure means extending from said peripheral ring for slideably engaging said recess means to guide said latch member in its movement between said positions; said structure means being configured in the form of a handle projecting above said top surface in said unlatched position to facilitate the manual closing of said cap while also providing said visual indication of said unlatched position, said handle being accommodated completely within said recess means when said latch member is in said latched position;

said inlet stub having an inner wall surface and an outer wall surface, said first thread being formed on one of said wall surfaces; and, said catch means including first tooth means extending parallel to said axis and being formed on the other one of said wall surfaces of said inlet stub; and, second tooth means likewise extending parallel to said axis and being formed on said peripheral ring for engaging said first tooth means when said latch member is depressed into said latched position.

3. The threaded closure of claim 2, said first tooth means being formed on the outer wall of said inlet stub; said peripheral ring having an inner wall surface facing said base body, said second tooth means being formed on said inner wall surface of said peripheral ring.

4. The threaded closure of claim 3, said peripheral ring being a circular ring and said base body having a circular cross-section taken transverse to said axis; said handle being configured as a transverse strut extending diametrically across said ring; and, said recess means being a transverse slot extending diametrically into said base body.

5. The threaded closure of claim 4, said handle and said slot having respective rectangular cross-sections.

6. The threaded closure of claim 5, said handle having a foot portion remaining in said slot when said latch member is in said unlatched position.

7. The threaded closure of claim 6, said handle having a top edge, said top edge and said top surface being in a common plane when said latch member is in said latched position.

8. The threaded closure of claim 7, said slot having a depth corresponding at least to the distance from the lower edge of said foot portion to said top edge.

9. The threaded closure of claim 8, said base body including a bottom surface facing away from said top surface; and, a plug-like projection extending downwardly from said bottom surface and having a peripheral surface; and, said second thread being formed on said outer peripheral surface of said plug-like projection; said base body having a peripheral outer surface between said top and bottom surfaces, said peripheral outer surface between said top and bottom surfaces being disposed above said second thread; said second tooth means formed on said ring being adjacent said peripheral outer surface when said latch member is in said unlatched position.

10. The threaded closure of claim 9, said ring having a circular lower edge, said circular lower edge and said bottom surface being in a common plane when said latch member is in said unlatched position.

11. The threaded closure of claim 10, said first thread being formed on said inner wall of the inlet stub for threadably engaging said second thread of said plug-like projection; said second tooth means being in engagement with said first tooth means and in spaced relationship to said second thread when said latch member is in said latched position.

12. The threaded closure of claim 11, said latch member including a bolt slideably engaging said base body for axially guiding said latch member in its movement between said positions.

13. The threaded closure of claim 12, said plug-like projection having a lower end face; said base body and said plug-like projection having a bore extending therethrough and communicating with said slot, said bolt having a top end portion fixedly attached to said handle, the remaining portion extending through said bore and protruding outwardly from said bore at said lower end face; said bolt having a limiting head at its lower end for coming into contact engagement with said lower end face when said latch member is in said unlatched position thereby preventing the removal of said latch member from said base body when pulled upwardly into said unlatched position; said limiting head being spaced away from said lower end face in said latched position by an amount corresponding to the displacement of said ring when said latch member is moved from said latched position to said unlatched position.

14. The threaded closure of claim 2, said first tooth means being a plurality of fine teeth distributed over the entire outer wall surface of said inlet stub; and, said second tooth means likewise being a plurality of fine teeth and being formed on the entire inner wall surface of said peripheral ring.

15. A closure for a fuel tank with a fuel inlet stub defining a longitudinal axis, the tank being adaptable for a hand-guided, motor-driven tool such as a motor-driven chain saw or the like, the closure comprising:

first engaging means formed on the fuel inlet stub;

a closure cap including a base body defining a longitudinal axis coincident with the first-mentioned longitudinal axis and having a top surface facing away from the inlet stub; second engaging means formed on said base body for mechanically engaging said first engaging means when said cap is placed on said inlet stub for manually closing the tank; and, recess means formed in said base body and extending across at least a portion of said top surface;

a manually-actuable latch member displaceably journalled in said recess means for movement only in a single plane relative to said cap and along said axis between an unlatched position whereat said latch member is spaced away from said inlet stub so as to project upwardly beyond said top surface to provide a visual indication that said cap is unlatched and a latched position whereat said latch member is depressed in elevation with respect to said cap so as to be in engagement with said inlet stub; and, catch means formed on said inlet stub and on said latch member for engaging said latch member when in said latched position to block any movement of said closure cap whereby said cap is secured in the closed position thereof.

* * * * *